3,067,148
CELLULAR POLYURETHANE PLASTICS AND
PREPARATION OF SAME
Robert L. Sandridge, Proctor, and Andrew S. Morecroft, New Martinsville, W. Va., assignors to Mobay Chemical Company, Pittsburgh, Pa., a corporation of Delaware
No Drawing. Filed July 13, 1959, Ser. No. 826,416
6 Claims. (Cl. 260—2.5)

This invention relates to cellular polyurethane plastics and more particularly to cellular polyurethane plastics having controlled density and compression deflection properties.

Cellular polyurethane plastics obtained from an organic polyisocyanate, water and a polyhydric polyalkylene ether are known. Further, it is known that the density of cellular polyurethane plastics can be controlled by preparing a prepolymer from an organic diisocyanate and a linear dihydric polyalkylene ether and cross linking and foaming the prepolymer with a mixture of a trifunctional compound such as trimethylol propane and water. The density of the cellular product produced by this process increases with increased amounts of the trifunctional cross-linking agent in the presence of lesser amounts of water. Although the density of the products produced by this process can be controlled within narrow ranges, the compression deflection property of the products at a desired density is often unsatisfactory. It has proven difficult to control both the density and the compression deflection property of cellular polyurethane polyether base plastics. No satisfactory method of obtaining controlled density and compression deflection in successive preparations of polyether base polyurethane plastics has been heretofore available.

It is an object of this invention to provide a process for the preparation of cellular polyurethane plastics having improved physical properties. Another object of this invention is to provide a proces for the preparation of cellular polyurethane plastics having controlled compression deflection properties and density. Still another object of this invention is to provide a process for the production of cellular polyurethane plastics having controlled 25 percent compression deflection properties at rest.

The foregoing objects and others, which will become apparent from the following description, are accomplished in accordance with the invention, generally speaking, by providing a process for the preparation of cellular polyurethane plastics having a 25 percent compression deflection property at rest within the range of from about 0.5 lb./sq. in. to about 6 lbs./sq. in. and a density within the range of from about 1.5 lbs./cu. ft. to about 7 lbs./cu. ft. obtained by reaction of from about 0.5 weight-percent to about 2.5 weight-percent water, from about 20 weight-percent to about 40 weight-percent of an organic diisocyanate and about 60 weight-percent to about 80 weight-percent of a mixture of polyhydric polyalkylene ether having a molecular weight within the range of from about 1000 to about 5000 and a tetrahydric organic compound having a molecular weight below about 600, the composite hydroxyl number of said mixture of polyhydric ether and tetrahydric organic compound being within the range of from about 125 to about 180. Thus, this invention contemplates a process for the preparation of a cellular polyurethane plastic having a 25 percent compression deflection property at rest and a density within the above-defined ranges which comprises reacting a mixture of a polyhydric polyalkylene ether having from two to four hydroxyl groups and a tetrahydric organic compound in critical proportions to prepare a semi-rigid cellular polyurethane plastic. In accordance with a preferred embodiment of the present invention, cellular polyurethane plastics having a 25 percent compression deflection property at rest within the range of from about 0.9 lbs./sq. in. to about 3 lbs./sq. in. and a density within the range of from about 2 lbs./cu. ft. to about 4 lbs./cu ft. are prepared by reacting from about 0.8 weight-percent to about 1.8 weight-percent water and from about 20 weight-percent to about 35 weight-percent of an organic diisocyanate with about 60 weight-percent to about 80 weight-percent of a mixture of from about 72 weight-percent to about 90 weight-percent of a trihydric polyalkylene ether having a molecular weight within the range of from about 1000 to about 5000 and about 10 weight-percent to about 18 weight-percent of the reaction product of one mol of ethylene diamine and 4 mols of propylene oxide, the mixture of the trihydric polyalkylene ether and the ethylene diamine-propylene oxide reaction product having a composite hydroxyl number within the range of about 160 to about 170.

In accordance with this invention, proportions of organic diisocyanate, the mixture of trihydric and tetrahydric reactants and the amount of water used in the preparation of the cellular polyurethane plastic are varied proporitionately within these ranges to prepare cellular polyurethane plastics having the desired properties. If a cellular polyurethane plastic having a 25 percent compression deflection property at rest of about 2.6 lbs./sq. in. and a density of about 4 lbs./cu. ft. is to be obtained, then the proportion of reactants is controlled so that about 0.8 weight-percent water and about 25.7 weight-percent of an organic diisocyanate are reacted with about 71.2 weight-percent of a mixture of about 85 weight-percent of the trihydric alcohol having a molecular weight of about 3000 and about 15 weight-percent of the reaction product of one mol of ethylene diamine with four mols of propylene oxide, the composite hydroxyl number of said mixture being about 163.

The foregoing illustrative proportions of reactants demonstrate that approximately stoichiometric proportions of the diisocyanate are employed to react with the water and the tetrahydric alcohol-polyhydric polyalkylene ether mixture. In general, in practicing this invention, the proportions of reactants are controlled so that not more than about a 10 percent stoichiometric deficiency of isocyanate to 20 percent stoichiometric excess of isocyanate are present based on the isocyanate needs of the water and mixture of alcohols. In other words, it is necessary to have enough organic diisocyanate present to react with substantially all of the water and enough organic diisocyanate to react with substantially all of the hydroxyl groups in the mixture of alcohols. Still another way of expressing the operable proportions of reactants involves specifying an isocyanate index. "Isocyanate index" as used herein refers to the percentage of isocyanate used in relation to the amount necessary to react with all of the active hydrogen in the reaction mixture including H₂O and all the hydroxyl containing components. The isocyanate index may be adjusted to any suitable level, but it is preferred to have an isocyanate index within the range of about 90 to about 120. Most preferred are isocyanate indices within the range of about 95 to 110.

Best results are obtained when the reaction mixture contains an organo siloxane as a stabilizer. Any silicone compound known to stabilize a reaction mixture of this type may be used, but a siloxane oxyalkylene block copolymer having the formula

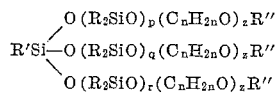

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34 is particularly advantageous. Organo silicone compounds of this type and a method for making them are disclosed in U.S. Patent 2,834,748.

Although all silicone compounds represented by the general formula given hereinbefore are broadly contemplated, best results have been obtained with a compound having the formula

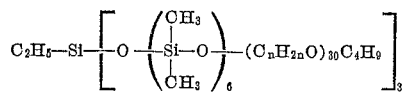

wherein $(C_nH_{2n}O)$ is a mixed polyoxyethylene and oxypropylene block copolymer containing about 17 oxyethylene units and about 13 oxypropylene units.

It is preferred to employ a catalyst in conjunction with the silicone compounds which act as stabilizers. Generally speaking, any suitable tertiary amine may be used as a catalyst. Although N,N'-dimethyl piperazine has been found to give the most satisfactory results, where the tetrahydric organic compound having a molecular weight below about 600 contains some tertiary nitrogen atoms, as in the reaction product of one mol of ethylene diamine and four mols of propylene oxide, stronger catalysts are preferred, where the tetrahydric organic compound contains no tertiary nitrogen atoms. Suitable catalysts of this type include N-ethyl morpholine, N-methyl morpholine and triethylene diamine.

The process of the invention may be carried out either in a one step process where all of the ingredients of the reaction mixture are brought together substantially simultaneously or in a two step process in which a prepolymer is formed in a first step under substantially anhydrous conditions by reaction between the polyhydric polyalkylene ether and an organic polyisocyanate and then reacted in a second step with water and the tetrahydric organic compound to form a cellular product. The catalyst and silicone oil may be incorporated into the reaction mixture in either step in the two step process but it is preferred to add it in the second step.

Any suitable polyhydric polyalkylene ether having from 2 to 4 hydroxyl groups and a molecular weight of at least about 500 may be used in the process of this invention. Examples of suitable polyhydric polyalkylene ethers include those prepared by condensation of an alkylene oxide having from 2 to 5 carbon atoms, such as, for example, polypropylene ether glycol, polyethylene ether glycol, polybutylene ether glycol or a glycol prepared from a mixture of two or more alkylene oxides, such as, for example, ethylene oxide, propylene oxide, butylene oxide, amylene oxide, and the like. A polyalkylene ether glycol prepared by polymerization of tetrahydrofuran or mixtures of these ether glycols with the condensation product of an alkylene oxide may also be used. Moreover, the condensation product of an alkylene oxide having from 2 to 5 carbon atoms and a polyhydric alcohol having from 3 to 4 hydroxyl groups, such as, for example, glycerine, trimethylol propane, triethanolamine, triethylolpropane, pentaerythritol, hexanetriol and the like, may be used provided the molecular weight of the condensation product is at least about 500. The polyhydric polyalkylene ethers may be prepared by any known process, such as, for example, by the process described by Wurtz in 1859 and in "Encyclopedia of Chemical Technology," vol. 7, pp. 257 to 262, published by Interscience Publishers, Incorporated, 1951, or in U.S. Patent 1,922,459. Preferably, the hydroxyl number of the polyalkylene ether alcohol will not be above about 150 and it will seldom be below about 25.

Any suitable tetrahydric organic compound may be used in conjunction with the polyhydric polyalkylene ethers, such as, for example, pentaerythritol, N,N,N',N'-tetrakis (2-hydroxy propyl) ethylene diamine, 1,2,4,5-hydroxy pentane, and N,N,N',N'-tetrakis (2-hydroxy propyl) hexamethylene diamine. It is preferred to employ tetrahydric organic compounds having a molecular weight below about 600.

Any suitable organic polyisocyanate including those disclosed in United States Reissue Patent 24,514 to Hoppe et al., issued August 12, 1958, may be used. Arylene diisocyanates are preferred, such as, for example, 2,4-toluylene diisocyanate, 2,6-toluylene diisocyanate, p,p'-diphenylmethane diisocyanate, 1,5-naphthalene diisocyanate and the like. Best results have been obtained up to this time with an isomeric mixture of about 20 percent 2,6-toluylene diisocyanate and about 80 percent 2,4-toluylene diisocyanate.

The cellular polyurethane plastics produced in accordance with this invention may be used in various commercial applications such as for cushions, packaging, upholstery, rug underlay, crash pads for automobiles, arm rests for automobiles and the like. The cellular polyurethane plastics produced in accordance with this invention are particularly suitable for crash pads and arm rests due to their fine cellular structure, controlled compression deflection properties and density.

In order to better describe and further clarify the invention, the following are specific embodiments in which the parts are by weight.

The examples are given in Table I. In the examples, approximately the indicated parts of a polyalkylene ether triol obtained from propylene oxide and glycerine condensed to a molecular weight of about 3000 and having an hydroxyl number of about 56 (referred to in the table as polyether) were combined with approximately the indicated parts of N,N,N',N'-tetrakis (2-hydroxy propyl) ethylene diamine (referred to in the table as tetrol) and subsequently combined with approximately the indicated weight-percentages of a mixture of 80 percent 2,4-toluylene diisocyanate and 20 percent 2,6-toluylene diisocyanate (referred to in the table as diisocyanate), the resulting mixture was then combined with approximately the indicated parts of water, a siloxane oxyalkylene block copolymer (referred to in the table as silicone oil) and N,N-dimethyl piperazine using the injection mixer disclosed in United States Reissue Patent 24,514. The combined reactants were allowed to flow into a mold where foaming took place to form a cellular polyether base polyurethane product and thereafter cured at about 150° F. for about 24 hours. The physical properties of the cellular polyurethane products were as indicated.

Table 1

| Ex. No. | Density, lbs./ft.³ | Index | 25% Compression deflection at rest, lbs./sq. in. | Tensile strength, lbs./sq. in. | Elongation at break, percent | Compression set, percent | Parts polyether | Parts tetrol | Parts di-isocyanate | H²O | Parts silicone oil | Parts N,N' Dimethyl Piperazine |
|---|---|---|---|---|---|---|---|---|---|---|---|---|
| 1 | 2.3 | 100 | 1.09 | 18.7 | 65 | 7.9 | 55.6 | 9.8 | 31.0 | 1.5 | 1.5 | 0.6 |
| 2 | 2.7 | 100 | 1.69 | 19.3 | 60 | 12 | 57.8 | 10.2 | 28.7 | 1.2 | 1.5 | 0.6 |
| 3 | 3.3 | 100 | 2.15 | 20.5 | 50 | 12 | 59.1 | 10.4 | 27.2 | 1.0 | 1.5 | 0.8 |
| 4 | 4.1 | 100 | 2.60 | 22.4 | 50 | 18 | 60.5 | 10.7 | 25.7 | 0.8 | 1.5 | 0.8 |
| 5 | 2.2 | 90 | .78 | 18.8 | 100 | 6.1 | 57.3 | 10.1 | 28.9 | 1.55 | 1.55 | 0.62 |
| 6 | 2.8 | 90 | 1.05 | 19.6 | 90 | 6.6 | 59.5 | 10.5 | 26.7 | 1.24 | 1.55 | 0.62 |
| 7 | 3.1 | 90 | 1.21 | 22.1 | 95 | 4.7 | 60.8 | 10.7 | 25.2 | 1.03 | 1.55 | 0.82 |
| 8 | 3.9 | 90 | 1.64 | 20.1 | 85 | 5.7 | 62.2 | 11.0 | 23.8 | 0.82 | 1.55 | 0.82 |
| 9 | 2.4 | 100 | 1.36 | 15.0 | 45 | 18 | 58.5 | 8.36 | 29.5 | 1.5 | 1.5 | 0.6 |
| 10 | 2.8 | 100 | 1.55 | 17.5 | 60 | 15 | 60.8 | 8.7 | 27.2 | 1.2 | 1.5 | 0.6 |
| 11 | 4.3 | 100 | 2.40 | 20.6 | 60 | 9.4 | 63.9 | 9.1 | 24.1 | 0.8 | 1.5 | 0.6 |
| 12 | 2.4 | 90 | 1.09 | 15.5 | 80 | 8.7 | 60.3 | 8.5 | 27.4 | 1.55 | 1.5 | 0.6 |
| 13 | 2.7 | 90 | 1.16 | 17.5 | 85 | 9.1 | 62.5 | 8.9 | 25.2 | 1.24 | 1.5 | 0.6 |
| 14 | 4.2 | 90 | 1.82 | 18.9 | 75 | 6.9 | 65.5 | 9.3 | 22.2 | 0.82 | 1.5 | 0.6 |
| 15 | 3.8 | 105 | 2.12 | 27.8 | 42 | 26 | 56.3 | 12.0 | 29.4 | 0.97 | 1.0 | 0.6 |
| 16 | 2.3 | 105 | 1.0 | 10.8 | 35 | 23 | 51.7 | 11.0 | 34.0 | 1.54 | 1.4 | 0.5 |

Although the foregoing examples utilize only some of the reactants more fully set out above, it is to be understood that any other suitable organic polyisocyanate polyhydric polyalkylene ether-tetrahydric organic compound mixture, catalyst and the like could have been used with equally satisfactory results.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. A process for the preparation of a cellular polyurethane plastic having a 25 percent compression deflection propery at rest within the range of from about 0.5 lbs./sq. inch to about 6 lbs./sq. inch and a density within the range of from about 1.5 lbs./cu. foot to about 7 lbs./cu. foot which comprises reacting (1) from about 0.5 weight percent to about 2.5 weight percent water, (2) from about 20 weight percent to about 40 weight percent of an organic diisocyanate and (3) from about 60 weight percent to about 80 weight percent of a mixture of a trihydric polyalkylene ether having a molecular weight within the range of from about 1000 to about 5000 with from about 10 weight percent to about 18 weight percent based on the weight of said trihydric polyalkylene ether of a tetrahydric organic compound having a molecular weight below about 600 and selected from the group consisting of pentaerythritol, N,N,N',N'-tetrakis (2-hydroxy propyl) ethylene diamine, 1,2,4,5-hydroxy pentane and N,N,N',N'-tetrakis (2-hydroxy propyl) hexamethylene diamine, the composite hydroxyl number of said mixture of polyhydric polyalkylene ether and tetrahydric organic compound being within the range of from about 125 to about 180, the sum of (1), (2) and (3) being at most 100 weight percent.

2. The product of the process of claim 1.

3. The process of claim 1 wherein said tetrahydric organic compound is N,N,N',N'-tetrakis (2-hydroxy propyl) ethylene diamine.

4. A process for the prepartion of a cellular polyurethane plastic having a 25 percent compression deflection property at rest within the range of from about 0.9 lbs./sq. in. to about 3 lbs./sq. in. and a density within the range of from about 2 lbs./cu. ft. to about 4 lbs./cu. ft. which comprises reacting (1) from about 0.8 weight-percent to about 1.8 weight-percent water, (2) from about 20 weight-percent to about 40 weight-percent of an organic diisocyanate and (3) from about 65 weight-percent to about 80 weight-percent of a mixture comprising about 72 weight-percent to about 90 weigh-percent of a trihydric polyalkylene ether and about 10 weight-percent to about 18 weight-percent of N,N,N',N'-tetrakis (2-hydroxy propyl) ethylene diamine, said mixture having a composite hydroxyl number of about 160 to about 170, the sum of (1), (2) and (3) being at most 100 weight-percent.

5. The process of claim 4, wherein said organic diisocyanate is toluylene diisocyanate.

6. A process for the preparation of a cellular polyurethane plastic having a 25 percent compression deflection property at rest of about 2.6 lbs./sq. in. and a density of about 4 lbs./sq. in. which comprises reacting about 0.8 weight-percent water, about 25 weight-percent of a mixture comprising 80 percent 2,4-toluylene diisocyanate and 20 percent 2,6-toluylene diisocyanate and about 71 weight-percent of a mixture of about 15 weight-percent N,N,N',N'-tetrakis (2-hydroxy propyl) ethylene diamine and about 85 weight-percent of a trihydric polyalkylene ether having a molecular weight of about 3000, the composite hydroxyl number of said mixture of N,N,N',N'-tetrakis (2-hydroxy propyl) ethylene diamine and trihydric polyalkylene ether being about 163.

References Cited in the file of this patent
UNITED STATES PATENTS 2,866,774   Price _____ Dec. 30, 1958
2,915,496   Swart et al. _____ Dec. 1, 1959